(12) United States Patent
Hayashi

(10) Patent No.: US 6,971,798 B2
(45) Date of Patent: Dec. 6, 2005

(54) GAS DYNAMIC PRESSURE BEARING UNIT, SPINDLE MOTOR, HARD DISK DRIVE AND POLYGON SCANNER UTILIZING GAS DYNAMIC PRESSURE BEARING SYSTEM

(75) Inventor: Takeo Hayashi, Kyoto (JP)

(73) Assignee: Nidec Corporation, Kyoto (JP)

( * ) Notice: Subject to any disclaimer, the term of this patent is extended or adjusted under 35 U.S.C. 154(b) by 17 days.

(21) Appl. No.: 10/709,523

(22) Filed: May 12, 2004

(65) Prior Publication Data

US 2004/0228552 A1 Nov. 18, 2004

(30) Foreign Application Priority Data

May 12, 2003 (JP) .............................. 2003-132601

(51) Int. Cl.[7] .............................................. F16C 17/02
(52) U.S. Cl. ....................................... 384/112; 384/107
(58) Field of Search ........................ 384/107, 112, 119, 384/124, 115

(56) References Cited

U.S. PATENT DOCUMENTS 6,200,035 B1 3/2001 Otsuki

FOREIGN PATENT DOCUMENTS

| JP | 2000-304037 A | 10/2000 |
|----|---------------|---------|
| JP | 2004-028113 A | 1/2004 |

*Primary Examiner*—Lenard A. Footland
(74) *Attorney, Agent, or Firm*—Judge Patent Firm

(57) ABSTRACT

It is the object of this invention to provide a gas dynamic pressure bearing system with high rigidity and reliability. The unit is configured such that a thrust bearing sends lubricating gas under pressure in a radial direction, and a radial bearing sends the gas toward the thrust bearing, thereby increasing the bearing rigidity. In addition, one or more dynamic pressure generating grooves which constitute the thrust bearing are extended and connected to a particle catching holes formed in a shaft. With those configurations, the dust particles are trapped in the catching hole and are kept away from the bearing gaps.

12 Claims, 9 Drawing Sheets

GAS DYNAMIC PRESSURE BEARING UNIT, SPINDLE MOTOR, HARD DISK DRIVE AND POLYGON SCANNER UTILIZING GAS DYNAMIC PRESSURE BEARING SYSTEM

BACKGROUND OF INVENTION

1. Field of the Invention

The present invention relates to a gas dynamic pressure bearing system. The invention also relates to a spindle motor, a data storage disk drive and a polygon scanner using the gas dynamic pressure bearing system.

2. Description of the Background Art

In recent years, it has increasingly been required to enhance the speed of access to information in a hard disk drive or an optical disk drive, and to enhance printing quality and speed in a digital copier and a laser printer. To meet the requirements, the precision and rotation speed of the spindle motor used in such machines is enhanced. Spindle motors with higher precision are also required for those machines.

To enhance the precision and rotation speed of the spindle motor, it is proposed to use the gas dynamic pressure bearing system as a bearing system of the spindle motor. The gas dynamic pressure bearing system supports a rotating member in a non-contact manner, when the rotating member is rotating, by a dynamic pressure of gas filled in a minute gap formed between members.

In the gas dynamic pressure bearing system, however, at the moment of start or stop rotating, bearing surfaces come into contact with each other, and abrasion particles are formed by wearing. Such abrasion particles are accumulated in a gap of the thrust bearing, and will eventually enter a minute gap of a radial bearing. The gap between bearing surfaces of the radial bearing is smaller than those of the thrust bearing, and the radial bearing surfaces are prone to be damaged by the abrasion particles. Some portion of the abrasion particles could escape from the bearing system and contaminates a disk chamber. Such situation causes a reading error or a writing error of data of the disk, and a magnetic heads or recording surfaces of the disk is damaged.

Some prior bearing systems have a circulation passage, which comprises an additional through-hole connecting the both end portions of the bearing gap, for the lubricant gas to circulate in the bearing. Although a portion of the dust particles is trapped on the way through the through-hole, the rigidity of the bearing system is not sufficient because the pressure of the lubricant gas decreased through the through-hole.

Thus, there is a need in the art for a gas dynamic bearing system design which is capable of providing sufficient rigidity together with a particle trap mechanism.

SUMMARY OF INVENTION

The present invention is a result of seeking a novel gas dynamic pressure bearing system in which abrasion particles generated by sliding motion of bearing surfaces are prevented from damaging the interior of the bearing system, while the rigidity of the bearing is kept sufficient.

In the gas dynamic pressure bearing system of the present invention, the thrust bearing increases a gas pressure toward the radial bearing. The radial bearing increases gas pressure toward the thrust bearing. With these two effects, a high pressure is applied to gas filled in the bearing gap in the vicinity of annular micro-gap portion between the gap of the thrust bearing and the gap of the radial bearing. In such a state, a dynamic pressure generated by rotation of the shaft is high, which support the shaft rigidly. As a result, the gas dynamic pressure bearing system exhibits high rigidity without narrowing the bearing gap.

Abrasion particles are generated when the bearing system starts rotating and stops rotating during which the bearing surface comes into direct contact. Since the gap of the bearing surface is especially small at the radial bearing gap, if the abrasion particles enter into the radial bearing gap, the radial bearing surface is damaged, and the bearing rotates abnormally. Thus, some devices are needed to prevent the abrasion particles from entering the radial bearing gap.

At the time of rated rotation, the radial bearing imparts on the oil greater pressure acting toward the thrust bearing than that the thrust bearing imparts acting toward the radial bearing. So the very few abrasion particles enter the radial bearing gap in this state, and the particles are accumulated between thrust bearing surfaces or at their outer peripheral portions.

However, when the bearing starts rotating or stops rotating, there is a risk that abrasion particles enter the radial bearing gap, since the radial bearing generates the weaker pressure and the particles between the thrust bearing surfaces tend to be carried by the dynamic-pressure-generating groove row.

Thereupon, in the present invention, a portion of the dynamic-pressure-generating groove of the thrust bearing is extended to form the particle catching hole. Since the dynamic-pressure-generating groove and the hole for catching particles are continuously formed, abrasion particles enter the hole with high probability, and the particles are retained in the hole.

With such a configuration, the lifetime of the bearing system is increased, and the reliability is enhanced. In addition, this bearing system is suitable for usage which requires cleanness such as a hard disk drive, since the particles are trapped in the particle catching hole.

The hole for catching the particles may be formed by directly forming a hole in an outer peripheral surface of the shaft.

There are other methods to form holes to the shaft. One of the methods comprises two steps. First, one or more grooves are formed on the axial face of the shaft, the diameter of which is larger at axially central portion and smaller at the both end portion, forming steps between the end and central portion, the steps extending radial direction. Second, the grooves on the step are covered by the face of the thrust plate and the grooves become holes, while the inner end of the grooves on the thrust plate is to be aligned to match the outer end of the grooves on the step. The process to carve grooves on the step face can be eliminated. In the case, one or more grooves on the thrust plate is extended inwardly and the extended portions are covered by the step face.

Those alternative methods are suitable when the material of the shaft is very hard to be drilled, reducing the machining costs.

In the gas dynamic pressure bearing system of the present invention, bearing loss at the time of high speed rotation is small. Therefore, if this gas dynamic pressure bearing system is utilized in a spindle motor for driving a disk which records a signal such as a hard disk or a super-fast optical disk, a preferable result can be obtained.

Similarly, this bearing system can be suitably used for a polygon mirror scanner which needs to rotate at extremely high speeds.

Since the amount of particles leaking from the bearing system is small, if the bearing system is applied to a spindle motor for a hard disk, the possibility that the disk surface is contaminated by particles is lowered, and the reliability thereof is enhanced.

DETAILED DESCRIPTION

First Embodiment

A first embodiment of the present invention will be explained using FIGS. 1, 2 and 5.

Figure 1:
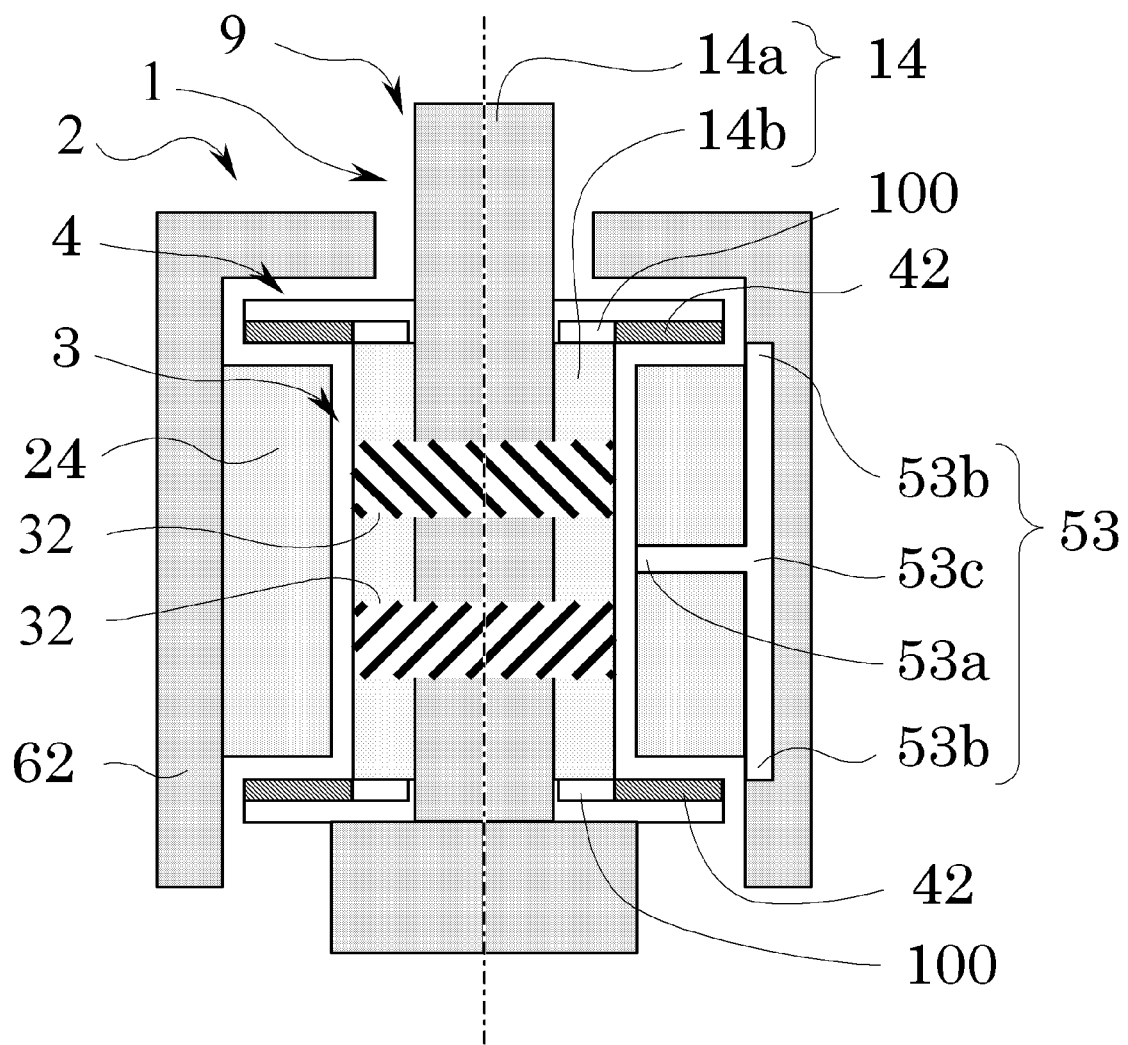
FIG. 1 is a sectional view of a gas dynamic pressure bearing system according to the present invention.

A gas dynamic pressure bearing system 9 shown in FIG. 1 includes a stationary part 1 and a rotary part 2. The radial bearing 3 and the thrust bearing 4 rotatably supports the rotary part 2 such that the rotary part 2 can rotate with respect to the stationary part 1.

The stationary part 1 comprises a shaft 14 and two thrust plates 15 separated away from each other in an axial direction of the shaft 14. A surface of each the thrust plate 15 radially spreads, constituting a flat surface of the stationary part, and a thrust bearing surface 13 is formed thereon.

The shaft 14 comprises an inner shaft 14a and an outer shaft 14b which is fitted over the inner shaft 14a. By mounting the outer shaft 14b, the shaft is formed with a columnar enlarged portion. An outer peripheral surface of the enlarged portion is a radial bearing surface 11. A lower surface of the thrust plate 15 is the thrust bearing surface 13.

The rotary part 2 includes a sleeve 24 and a hub 62 which is fitted over the sleeve 24. The sleeve 24 is a hollow cylindrical shape having a hole which penetrates the sleeve 24 in an axial direction thereof. An inner peripheral surface of the sleeve 24 is a radial bearing surface 21. An axial end surface of the sleeve spreads in its radial direction, constituting a flat surface of the rotary part, and a thrust bearing surface 23 is formed thereon.

The radial bearing surface 11 of the stationary part 1 and the radial bearing surface 21 of the sleeve are opposed to each other through a micro-gap. The micro-gap is filled with gas. On the radial bearing surface on the side of the stationary part, radial dynamic-pressure-generating groove rows are formed. In each row, a plurality of dynamic-pressure-generating grooves is arranged on the bearing surface in a circumferential direction. In the case of the structure shown in FIG. 1, two radial dynamic-pressure-generating groove rows 32 and 32 are formed apart in the axial direction. Each groove row constitutes the radial bearing, and two radial bearings support the rotary part 2.

Figure 2:
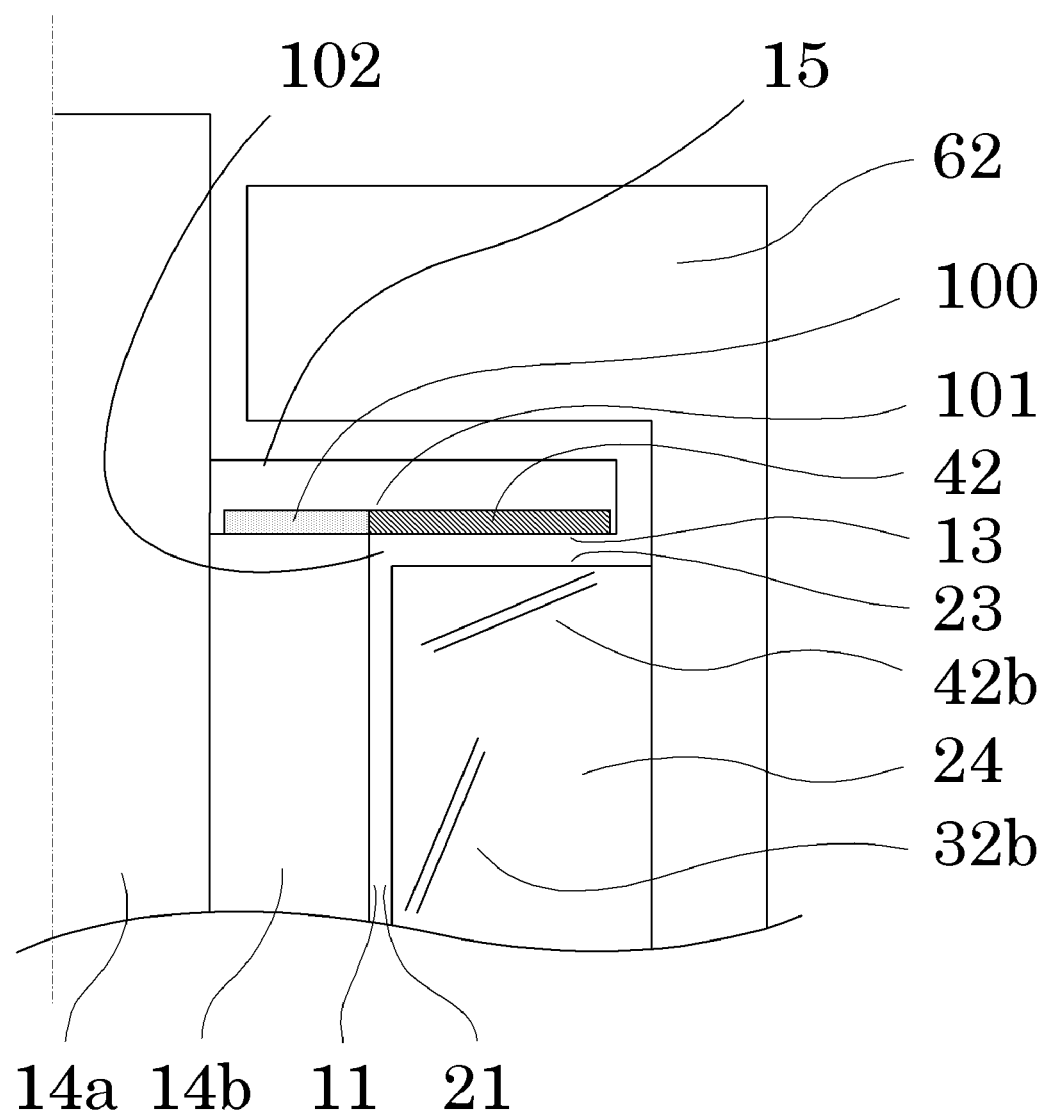
FIG. 2 is an enlarged sectional view 1 of the gas dynamic pressure bearing system of the invention in the vicinity of a particle-catching hole.

The thrust bearing surface 13 of the stationary part 1 and the thrust bearing surface 23 of the rotary part 2 are opposed to each other through a micro-gap (FIG. 2). The micro-gap is filled with gas. On the thrust bearing surface 13 of the stationary part 1, a thrust dynamic-pressure-generating groove row 42 is formed. In the groove row, a plurality of dynamic-pressure-generating grooves is arranged on the bearing surface in the circumferential direction, thereby constituting the thrust bearing.

In FIG. 2, inclination of double lines 32b or 42b to bearing surface beside means that the dynamic-pressure-generating groove row generate a gas pressure difference on the bearing surface, and the gas pressure is increased at the separated end of the double line from the bearing surface comparing to the near end.

That is, in FIG. 2, the thrust dynamic-pressure-generating groove row 42 functions to increase the pressure of gas toward a annular micro-gap portion 102 between a gap of the radial bearing and a gap of the thrust bearing. Similarly, the radial dynamic-pressure-generating groove row 32 (not shown in FIG. 2) functions to increase the pressure toward the annular micro-gap portion 102.

Here, the gap of the radial bearing and the gap of the thrust bearing are connected to each other over the entire periphery of the bearing, and the annular micro-gap portion 102 is also annularly formed. Gas filled in the micro-gaps can flow through the annular micro-gap portion.

At the time of rated rotation, the radial dynamic-pressure-generating groove row generates higher pressure difference than that generated by the thrust dynamic-pressure-generating groove row. So the gas filled in the micro-gap of the bearing tends to move toward the thrust bearing from the radial bearing. However, if this trend remains as it is, gas is lost from a region sandwiched between the two radial dynamic-pressure-generating groove rows 32 and 32, and there is an adverse possibility that the gas dynamic pressure bearing system operates abnormally. Therefore, the rotary part is formed with a communication passage 53. That is, the radial bearing supplies, through the communication passage 53, the gas deficiency on its side where the pressure of the bearing gap is lowered. At the time of rated rotation, gas which was lost from a space between the radial dynamic-pressure-generating groove rows is supplemented by gas flowing through the communication passages 53b, 53c and 53a. This communication passage 53 is connected, through a peripheral space, to a side of the thrust bearing where a pressure of the bearing gap is lowered. When the bearing system starts rotating and stops rotating, a pressure difference which is generated by the thrust dynamic-pressure-generating groove row 42 becomes relatively higher than that generated by the radial dynamic-pressure-generating groove row 32. Therefore, the airflow passing through the communication passage 53 reversed.

Dust generated when the bearing surface comes into direct contact is mainly generated on the side of the thrust bearing. If the particle enters the radial bearing, the bearing surface is damaged and affected seriously. This is because that the micro-gap between the bearing surfaces of the radial bearing is smaller than that of the thrust bearing. At the time of rated rotation, the gas in the bearing flows from the radial bearing to the thrust bearing, and a centrifugal force is also applied. Therefore, the possibility that the particle generated in the thrust bearing enters the radial bearing is small. When the bearing system starts rotating and stops rotating, since gas may flow from the thrust bearing to the radial bearing in some cases, it is necessary to catch the particles and to reduce the invasion of particles to the radial bearing.

The particle catching hole 100 is provided for this purpose. FIG. 5 is a plan view of the thrust plate 15. FIG. 5 shows the thrust dynamic-pressure-generating groove row 42 and the particle catching holes 100 formed by extending their grooves. In FIG. 5, however, the particle catching hole 100 is a groove and is not a hole. Since the thrust plate 15 is mounted on an end surface of the outer shaft 14*b* in the axial direction thereof, the opening of the groove structure 100 in FIG. 5 is closed by the outer shaft end surface and becomes the particle catching hole 100.

Since each the particle catching hole 100 opens adjacent an end 101 of the thrust dynamic-pressure-generating groove, particles in the thrust bearing is efficiently introduced into the hole and caught. Since the bearing on the side of the stationary part 1 is always formed with the particle catching hole, a centrifugal force caused by rotation is not applied to the caught particles, and the returning of particles into the bearing is very rare.

According to the gas dynamic pressure bearing system shown in FIG. 1, particles in the thrust bearing is effectively prevented from entering the radial bearing, lifetime of the bearing system is increased and the reliability is enhanced. Since the particles are trapped, the possibility that the particles are discharged outside of the bearing system is reduced.

Modification of the First Embodiment

A modification of the first embodiment will be explained using FIGS. 3, 4 and 6.

Figure 3:
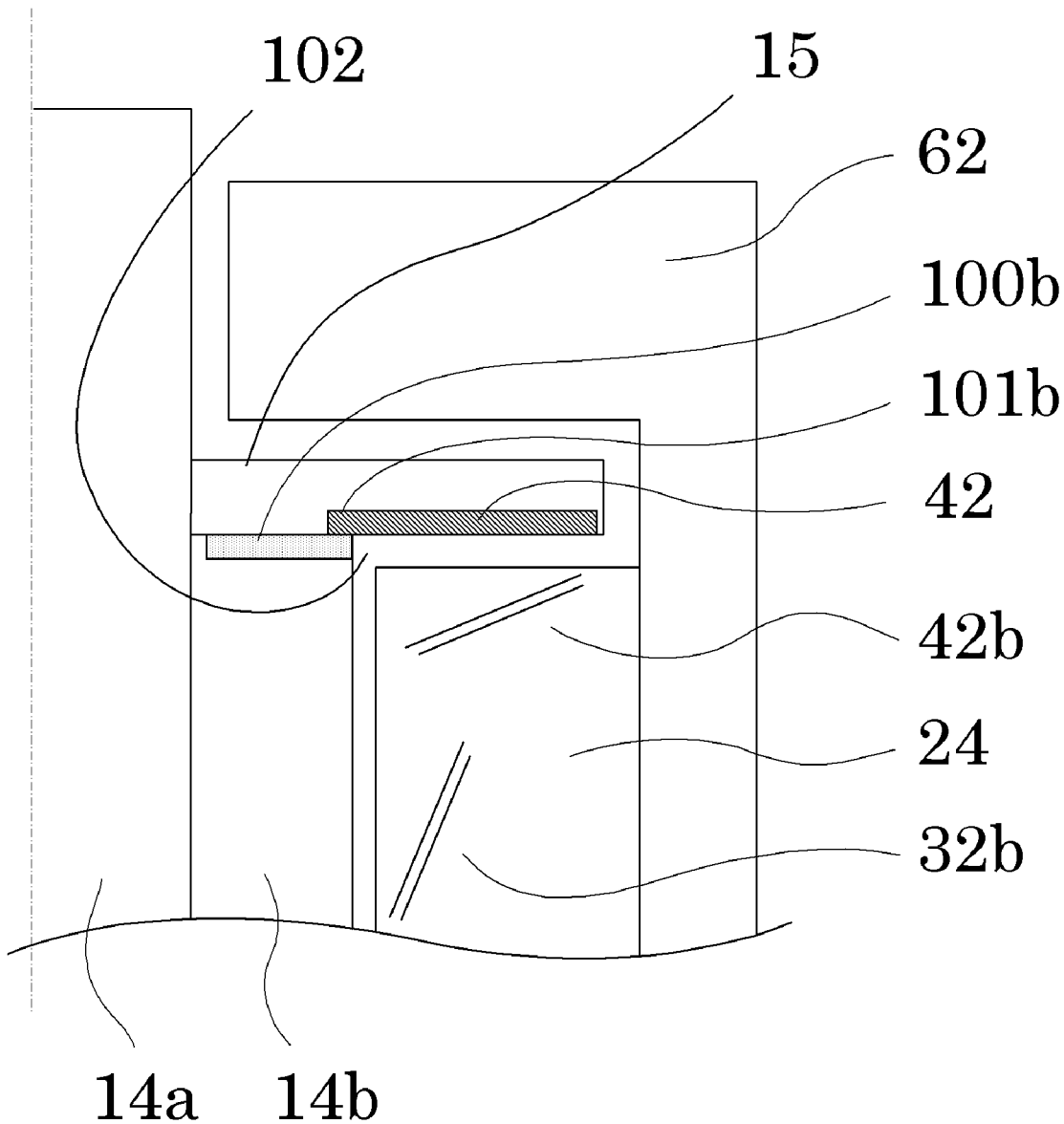
FIG. 3 is an enlarged sectional view 2 of the gas dynamic pressure bearing system of the invention in the vicinity of the particle-catching hole.

In FIG. 3, the particle catching hole is formed in an end of the outer shaft 14*b* instead of the thrust plate 15. FIG. 6 is a plan view of the particle catching hole. In this example also, the particle catching hole 100*b* is a groove before the thrust plate 15 is mounted on the outer shaft end. An opening of the groove is closed with the thrust plate 15, and the opening becomes the particle catching hole 100*b*.

According to the structure shown in FIG. 3, the end 101*b* of the thrust dynamic-pressure-generating groove row 42 is slightly extended toward the outer shaft 14*b*, and partially superposed with the particle catching hole 100*b*. With this configuration, particles in the thrust dynamic-pressure-generating groove are efficiently introduced into the particle catching hole. Among the dynamic-pressure-generating grooves which constitute the thrust dynamic-pressure-generating groove row 42, if only the dynamic-pressure-generating groove which is superposed with the particle catching hole 100*b* is extended, this effect can be obtained.

Figure 4:
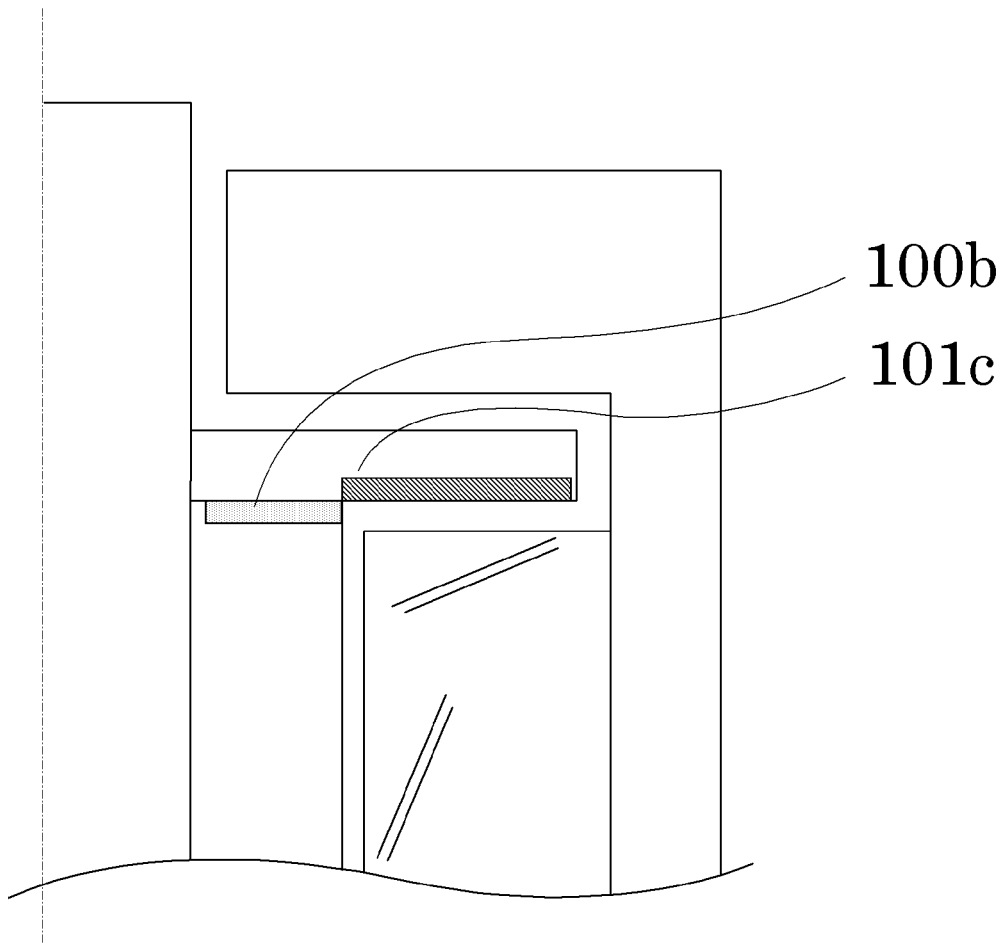
FIG. 4 is an enlarged sectional view 3 of the gas dynamic pressure bearing system of the invention in the vicinity of the particle-catching hole.

It is not always necessary to extend the end of the dynamic-pressure-generating groove 42, and the end may not be superposed with the particle catching hole 100*b* as shown in FIG. 4. Only if the opening of the particle catching hole and the end 101*c* of the thrust dynamic-pressure-generating groove row are opposed to each other, the effect for catching particles can be obtained. Among the dynamic-pressure-generating grooves which constitute the thrust dynamic-pressure-generating groove row 42, if only the dynamic-pressure-generating groove which is superposed with the particle catching hole 100*c* is opposed to the opening of the particle catching hole 100*b*, this effect can be obtained.

Second Embodiment

A second embodiment of the invention will be explained using FIG. 7.

Figure 7:
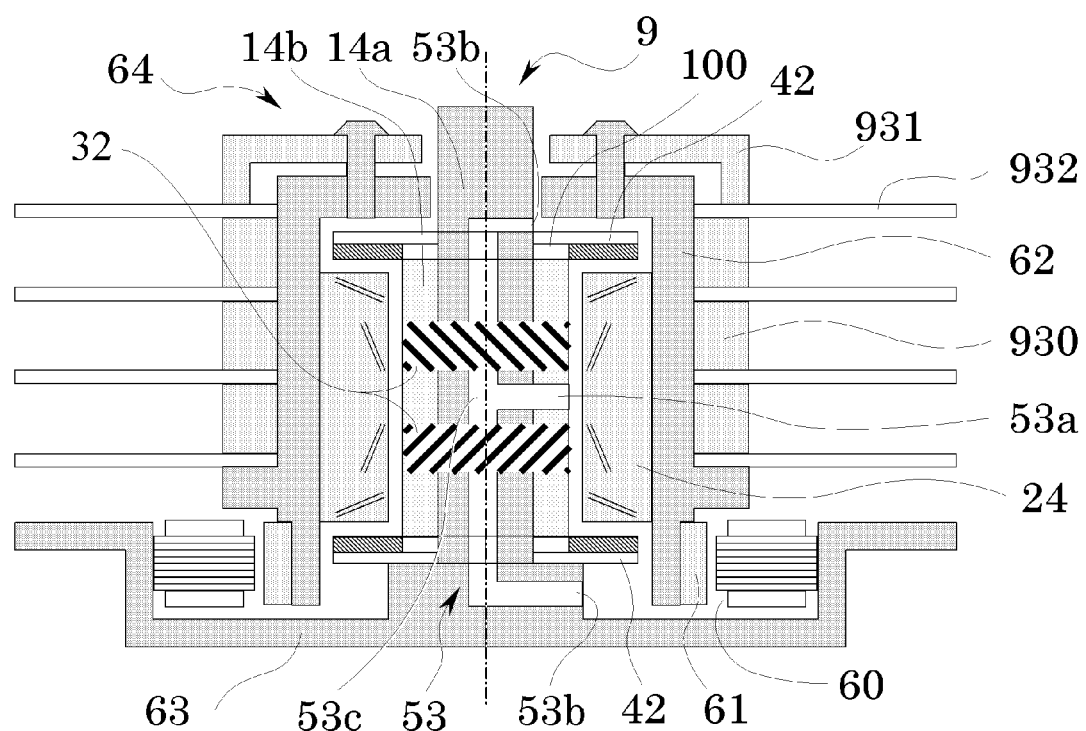
FIG. 7 is a sectional view of a spindle motor according to the invention.

FIG. 7 is a sectional view of a spindle motor 64 having a gas dynamic pressure bearing system 9 of the invention.

The gas dynamic pressure bearing system 9 includes radial dynamic-pressure-generating groove rows 32 and 32, and two radial bearings which are separated from each other in an extension direction of the shaft. The gas dynamic pressure bearing system 9 also includes thrust dynamic-pressure-generating groove rows 42 and 42 provided on two opposed thrust plates, and includes two thrust bearings which generate supporting forces in opposite directions. The double lines shown on the sleeve have the same meaning as those shown in FIG. 2. The dynamic-pressure-generating groove on the thrust bearing increases a pressure of air which lubricates the bearing surface toward the radial bearing. The dynamic-pressure-generating groove on the radial bearing increases a pressure of air which lubricates the bearing surface toward the thrust bearing.

A difference in pressure of air between the two radial bearings and air outside the thrust bearing generated by effect of the thrust and radial dynamic-pressure-generating grooves is overcome by providing the communication passage 53. One end 53*a* of the communication passage 53 is opened between the two radial bearings, and this point is the same as that of the gas dynamic pressure bearing shown in FIG. 1. On the other hand, the other ends 53*b*, 53*b* of the communication passage 53 are opened at upper and lower sides of the thrust plate. The communication passage 53 is formed in an inner shaft.

This configuration facilitates the working of the communication passage. This is because that since the inner shaft 14*a* has no portion that comes into direct slide, the communication passage can be made of normal metal material. On the other hand, the bearing surfaces of the outer shaft, the thrust plate and the sleeve must be made of ceramic having excellent wear resistance and high hardness. According to the structure of the communication passage shown in FIG. 7, since the centrifugal force is applied to particles generated in the thrust bearing, it is rare that a particles reaches the opening 53*b* of the communication passage. It is rare that the inside of the communication passage is contaminated by particles.

When a force is applied to the particles in the thrust bearing toward the radial bearing, the particles are caught by the particle catching holes which are continuously provided in the dynamic-pressure-generating groove 42, and the particles are prevented from entering the radial bearing.

In the spindle motor 64 having the gas dynamic pressure bearing system, a recording disk 932 is placed on a hub 62 fitted over the sleeve 24. The shaft 14 is fixed to a base 63, and a stator 60 is mounted on the base. Rotor magnets 61 are arranged annularly on a lower portion of the hub 62. Magnetic poles of the magnets are opposed to the stator.

According to the spindle motor having the above-described structure, particles generated in the bearing are not discharged out from the bearing, and will soon be caught by the particles catching hole 100. Therefore, the reliability as a bearing system is high and the spindle motor does not discharge particles. Thus, this spindle motor is especially suitable for a hard disk drive which is required to rotate at high speed.

Third Embodiment

Figure 8:
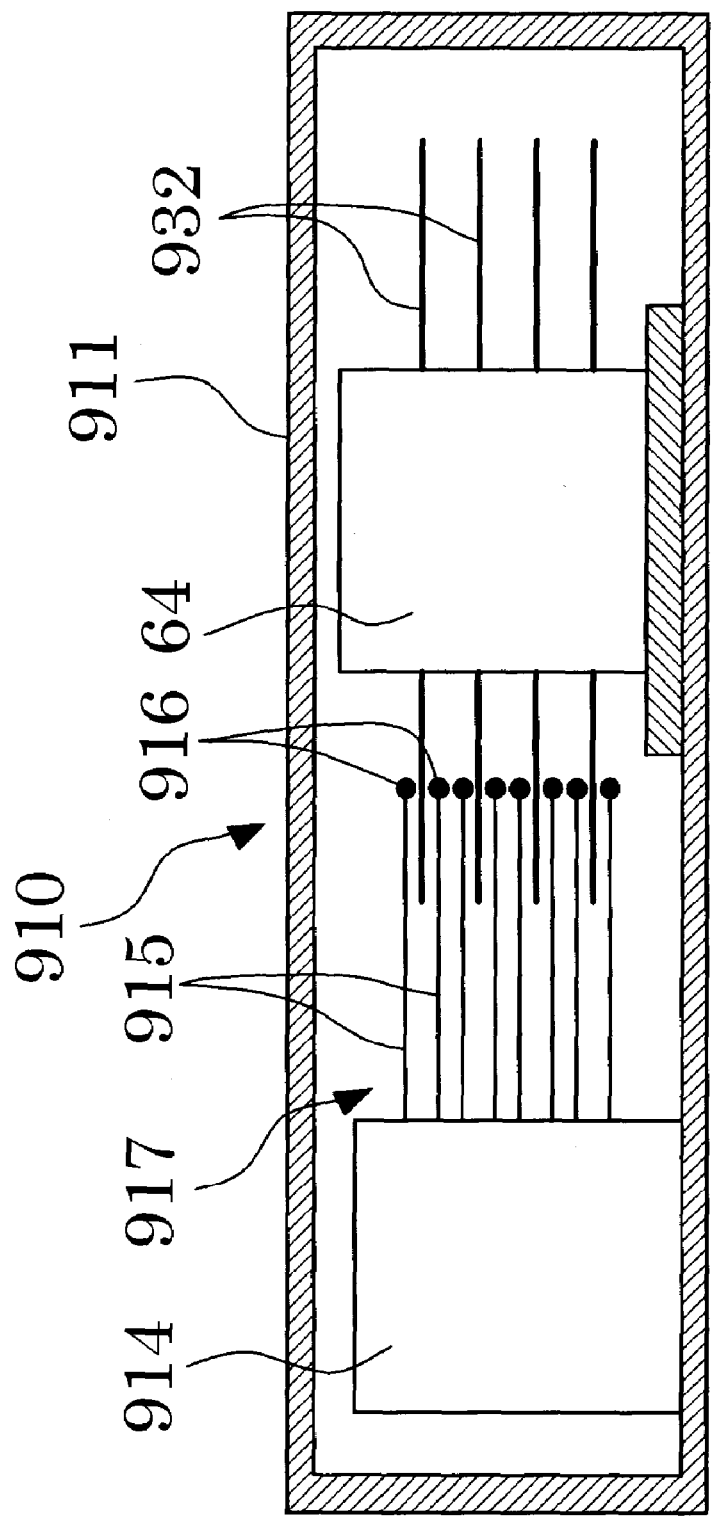
FIG. 8 is a sectional view of a data storage disk drive according to the invention.

A third embodiment of the invention is shown in FIG. 8.

FIG. 8 shows a data storage disk drive 910 having a spindle motor of this invention.

In a housing 911 of the data storage disk drive 910, a recording disk 932 is mounted on the spindle motor 9, and a magnetic head 916 supported by a swing arm 915 is opposed to a surface of the disk 932 at a small distance (micro-gap). When a particle enters the micro-gap, the particle injures the recording disk surface and the magnetic head, and reading and writing errors of information are caused. Therefore, particles should not exist in the housing 911.

When the spindle motor of the invention is used for the data storage disk drive, since it is difficult to discharge particles into the housing 911, the spindle motor can rotate at high speed, and the reliability of the data storage disk drive can be secured.

Fourth Embodiment

Figure 9:
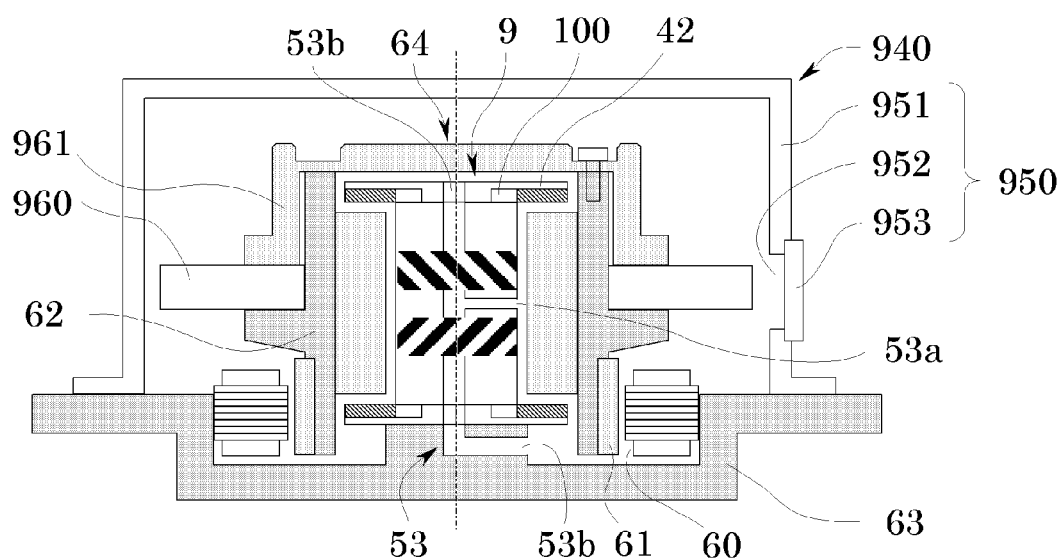
FIG. 9 is a sectional view of a polygon scanner according to the invention.

A fourth embodiment of the invention is shown in FIG. 9.

FIG. 9 shows a polygon scanner 940 having a spindle motor 64 of the invention.

In the spindle motor 64, a polygon mirror 960 is mounted on a hub 62, and the spindle motor rotates at high speed.

The spindle motor 64 and the mirror 960 are accommodated in a housing 950, and the spindle motor 64 and the mirror 960 reflect light entering from a beam-permeable slit 952 of a side surface of a cover 950. The slit 952 is covered with a clear glass cover 953.

The spindle motor 64 includes the gas dynamic pressure bearing system 9 of the invention, and the spindle motor has high bearing rigidity but has few troubles caused by generation of particles in the bearing system. The particle catching hole 100 is provided continuously with the thrust dynamic-pressure-generating groove row 42 and particles are trapped in the groove row. Therefore, particles enter the radial bearing surface and the bearing surface is not damaged.

The present invention is not limited to the above-explained embodiments. For example, although the dynamic-pressure-generating groove is illustrated on only one surface constituting the dynamic pressure gas bearing system in the drawings, the groove may be provided on the other surface which constitutes the dynamic pressure gas bearing system or may be provided on both the surfaces. Shapes of the dynamic-pressure-generating grooves are illustrated in the drawings corresponding to respective embodiments, but other shapes may be employed, and the same effect of the invention can be obtained. As shown in FIGS. 2 and 7, each the dynamic-pressure-generating groove enhances a pressure of air which lubricates the bearing in a direction specified in the specification. Although air is used as the gas which lubricates the bearing, gas other than air may be used only if the gas is noncorrosive gas.

Figure 5:
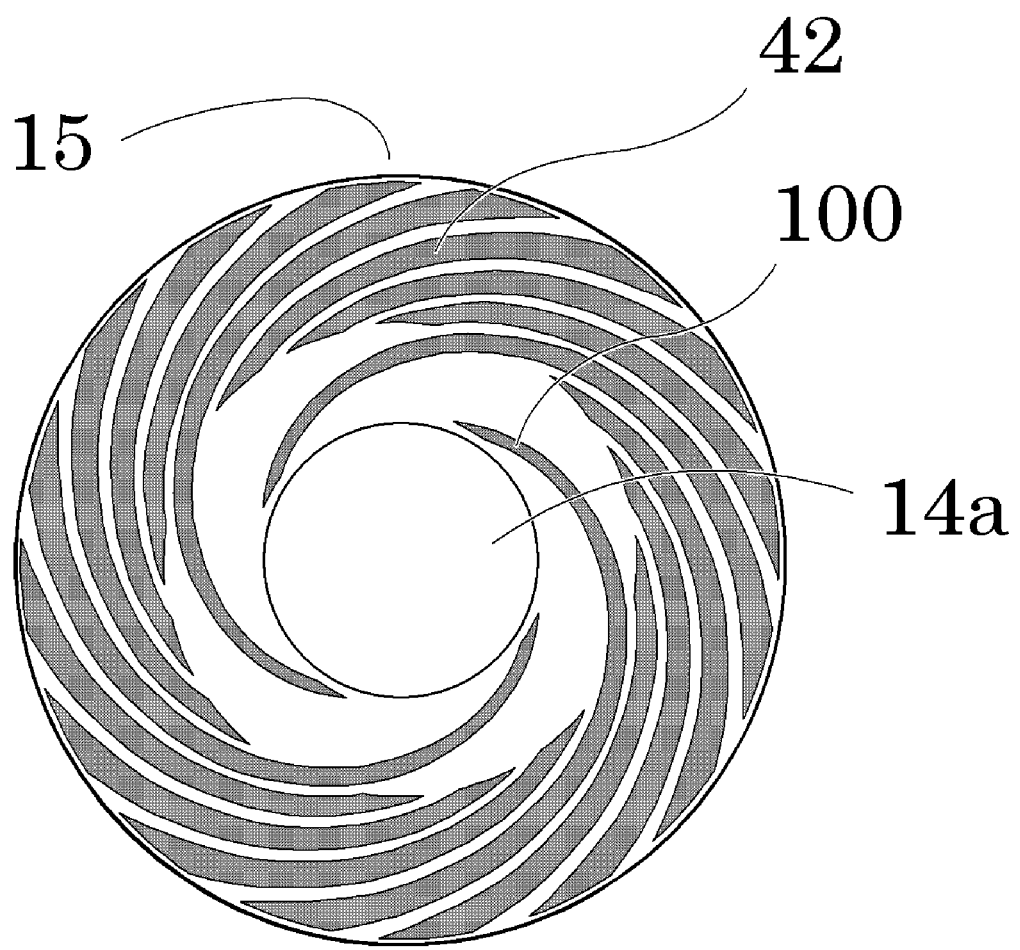
FIG. 5 is a plan view of a groove pattern formed on a thrust plate surface.
Figure 6:
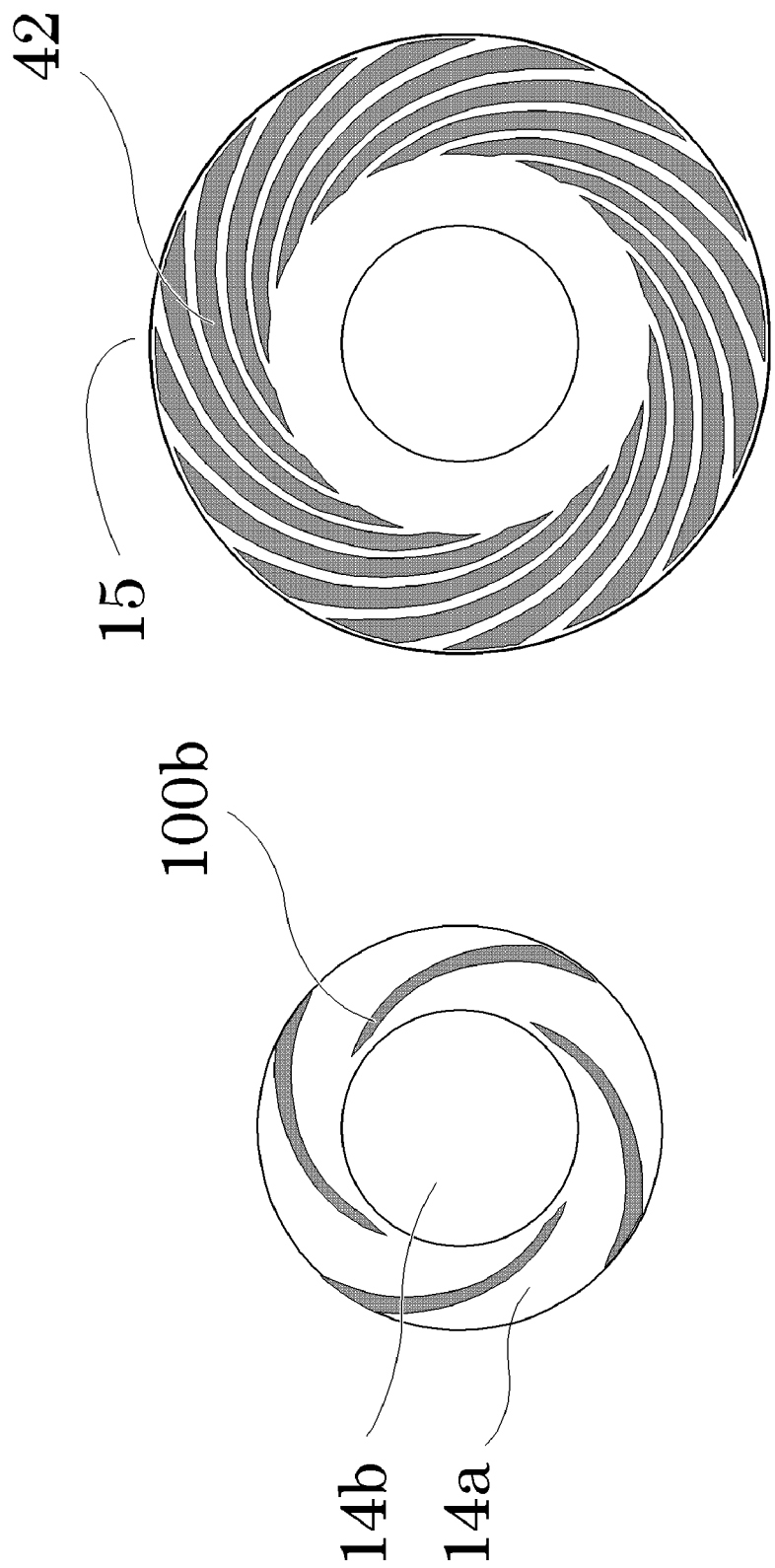
FIG. 6 is a plan view of the groove patterns formed on the thrust plate surface and an outer shaft end.

Although the number of particle catching holes illustrated in FIGS. 5 and 6 is four, the number is not limited to four. The number of the holes may be the same as the number of grooves in the thrust dynamic-pressure-generating groove row, or two particle catching holes may be formed for an opening of one thrust dynamic-pressure-generating groove. Even if the number of particle catching holes exceeds four, this does not depart from the scope of the invention.

The term "gap" in this specification will be explained. The gap in the specification means a gap between bearing surfaces in a state in which a gas dynamic pressure bearing system or a spindle motor rotates, a supporting force is generated by a thrust bearing and a radial bearing, and the bearing surfaces maintain the non-contact state. Therefore, when a product is checked when it is stopped, a gap can not be seen between the thrust bearing surfaces in some cases. Even in such a case, the bearing system has play so that a shaft body or a sleeve can float. Because this play exists, the bearing can rotate, and the gap is held between the bearing surfaces in a state where a sufficient supporting force is generated. Even when no gap can be visually seen when the bearing stopped, if the bearing is seen at the molecular level, the bearing surfaces are in contact at extremely small portions. From this viewpoint, it can be considered that the gap spreads over substantially the entire regions of the opposed surfaces of the bearing.

What is claimed is:

1. A gas dynamic pressure bearing unit comprising:
   a stationary part having a cylindrical outer peripheral surface, and a flat surface extending in a radial direction of the cylindrical outer peripheral surface;
   a rotary part having a hole with a cylindrical inner peripheral surface, and a flat surface extending in a radial direction of the cylindrical inner peripheral surface, said bearing hole into which said stationary part is inserted such that the stationary part and the rotary part can rotate relatively each other;
   a radial bearing including radial bearing surfaces formed on said outer peripheral surface and said inner peripheral surface, a radial dynamic-pressure-generating groove row formed on one or both of the bearing surfaces, a radial micro-gap formed in between these bearing surfaces, and gas filling said micro-gap; and
   a thrust bearing including thrust bearing surfaces respectively formed on said flat surface of said stationary part and said flat surface of said rotary part, a thrust dynamic-pressure-generating groove row formed on one or both of the thrust bearing surfaces, an axial micro-gap formed in between these thrust bearing surfaces, and gas filling said micro-gap, wherein:
   said radial micro-gap is connected to said axial micro-gap through an annular micro-gap portion;
   said thrust bearing increases a pressure of said gas toward said annular micro-gap portion during relative rotation of said stationary part and said rotary part;
   said radial bearing increases a pressure of said gas toward said annular micro-gap portion during relative rotation of said stationary part and said rotary part;
   a portion of said radial micro-gap where the pressure of said gas is lowered comparing to the pressure of the gas at said annular micro-gap portion is in communication with a portion of said axial micro-gap where the pressure of said gas is lowered comparing to the pressure of the gas at said annular micro-gap portion; and
   at least one particle catching hole is formed in said stationary part, which extends in radial direction of said cylindrical outer peripheral surface, opens to said annular micro-gap portion, the opening being adjacent to an end of one of grooves which constitute said dynamic-pressure-generating groove row.

2. The gas dynamic pressure bearing unit as set forth in claim 1, wherein:
   said stationary part comprises a shaft and a thrust plate, said cylindrical outer peripheral surface being a peripheral surface of the shaft, and said flat surface being a surface of the thrust plate; and
   said rotary part comprises a cylindrical hollow sleeve, said bearing hole being the hollow of the sleeve, said cylindrical inner peripheral surface being the inner peripheral surface of the hollow of the sleeve, and said flat surface of the rotary part being an axial end flat surface of the sleeve.

3. The gas dynamic pressure bearing as set forth in claim 2, wherein:

said shaft includes an enlarged portion whose diameter is enlarged comparing to other portions of the shaft, said radial bearing surface being a peripheral surface of the enlarged portion, an axial end of the enlarged portion having a flat face extending perpendicularly to the axis of the shaft, one side of said thrust plate comes into surface-contact with and fixed to the flat face of the enlarged portion;

a groove extending in a radial direction of said shaft is formed on one or both of the flat face and the one side of said thrust plate; and an opening side of the groove is closed by a surface contact between the one side of the thrust plate and the flat face of the enlarged portion, thereby forming the particle catching hole.

4. The gas dynamic pressure bearing as set forth in claim 3, wherein:

said shaft comprises an inner shaft and an outer shaft fitted over the inner shaft; and said enlarged portion comprises the outer shaft.

5. The gas dynamic pressure bearing as set forth in claim 4, wherein:

both axial ends of said enlarged portion have said flat faces respectively;

said stationary part has two thrust plates, both of which come into surface-contact with and fixed to said flat faces, the thrust plates including thrust bearing surfaces respectively, the thrust bearing faces which are in opposed relation to each other;

said sleeve of said rotary part has said flat faces at both axial ends of the sleeve respectively, the flat faces including thrust bearing surfaces respectively, the thrust bearing faces which are in opposed relation to each other in a back to back relation; and two thrust bearings are formed at both axial ends of the sleeve.

6. A spindle motor comprising:

said gas dynamic pressure bearing as set forth in claim 5;

a hub which integrally rotates with said rotary part;

a stator fixed to said stationary part; and a rotor magnet which is fixed to the hub such as to be opposed to the stator, and which constitutes a magnetic circuit together with the stator.

7. The gas dynamic pressure bearing as set forth in claim 3, wherein:

both axial ends of said enlarged portion have said flat faces respectively;

said stationary part has two thrust plates, both of which come into surface-contact with and fixed to said flat faces, the thrust plates including thrust bearing surfaces respectively, the thrust bearing faces which are in opposed relation to each other;

said sleeve of said rotary part has said flat faces at both axial ends of the sleeve respectively, the flat faces including thrust bearing surfaces respectively, the thrust bearing faces which are in opposed relation to each other in a back to back relation; and two thrust bearings are formed at both axial ends of the sleeve.

8. A spindle motor comprising:

said gas dynamic pressure bearing as set forth in claim 7;

a hub which integrally rotates with said rotary part;

a stator fixed to said stationary part; and a rotor magnet which is fixed to the hub such as to be opposed to the stator, and which constitutes a magnetic circuit together with the stator.

9. A recording disk drive comprising:

a housing;

said spindle motor as set forth in claim 8, the spindle motor being fixed to the housing;

a disk-like recording medium which is fixed to the hub, said recording medium capable of storing information; and means for writing and/or reading a signal on a predetermined position of said recording medium.

10. A polygon scanner comprising:

a housing;

said spindle motor as set forth in claim 8, the spindle motor being fixed to the housing; and a polygon mirror fixed to the hub.

11. A spindle motor comprising:

said gas dynamic pressure bearing as set forth in claim 3;

a hub which integrally rotates with said rotary part;

a stator fixed to said stationary part; and a rotor magnet which is fixed to the hub such as to be opposed to the stator, and which constitutes a magnetic circuit together with the stator.

12. A recording disk drive comprising:

a housing;

said spindle motor as set forth in claim 11, the spindle motor being fixed to the housing;

a disk-like recording medium which is fixed to the hub, said recording medium capable of storing information; and means for writing and/or reading a signal on a predetermined position of said recording medium.

* * * * *